(12) United States Patent
Watanabe et al.

(10) Patent No.: US 11,691,200 B2
(45) Date of Patent: *Jul. 4, 2023

(54) SILVER FINE PARTICLE PRODUCTION METHOD AND SILVER FINE PARTICLES

(71) Applicant: NISSHIN ENGINEERING INC., Tokyo (JP)

(72) Inventors: Shu Watanabe, Fujimino (JP); Shiori Sueyasu, Fujimino (JP); Keitaroh Nakamura, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 16/963,796

(22) PCT Filed: Jan. 10, 2019

(86) PCT No.: PCT/JP2019/000473
§ 371 (c)(1),
(2) Date: Jul. 21, 2020

(87) PCT Pub. No.: WO2019/146412
PCT Pub. Date: Aug. 1, 2019

(65) Prior Publication Data
US 2020/0346286 A1 Nov. 5, 2020

(30) Foreign Application Priority Data
Jan. 26, 2018 (JP) ................................ 2018-011478

(51) Int. Cl.
B22F 9/12 (2006.01)
(52) U.S. Cl.
CPC .......... *B22F 9/12* (2013.01); *B22F 2301/255* (2013.01); *B22F 2304/054* (2013.01)

(58) Field of Classification Search
None
See application file for complete search history.

(56) References Cited

U.S. PATENT DOCUMENTS 5,399,832 A * 3/1995 Tanisaki ..................... B01J 8/24
219/121.43
10,144,060 B2 12/2018 Watanabe et al.
(Continued)

FOREIGN PATENT DOCUMENTS

CN 1895819 A 1/2007
CN 104259455 A 1/2015
(Continued)

OTHER PUBLICATIONS

English translation of JP 2005-081198 (originally published Mar. 31, 2005) from Espacenet.*
(Continued)

*Primary Examiner* — George Wyszomierski
(74) *Attorney, Agent, or Firm* — Muncy, Geissler, Olds & Lowe, P.C.

(57) ABSTRACT

Provided are: a production method for silver fine particles that retain capabilities such as conductivity and make it possible to form wiring at even lower temperatures; and silver fine particles. A silver fine particle production method in which silver powder is used to produce silver fine particles by means of a gas phase method. The silver fine particle production method has a step for supplying an organic acid to the silver fine particles. The gas phase method is, for example, a plasma method or a flame method. The silver fine particles have a surface coating that includes at least a carboxyl group.

3 Claims, 4 Drawing Sheets

(56) References Cited

U.S. PATENT DOCUMENTS

| | | |
|---|---|---|
| 2006/0199008 A1 | 9/2006 | Sato |
| 2007/0051699 A1* | 3/2007 | Kiehlbauch ............ C03C 15/00 |
| | | 216/67 |
| 2007/0084308 A1 | 4/2007 | Nakamura et al. |
| 2008/0145633 A1* | 6/2008 | Kodas .................... C03C 3/122 |
| | | 428/220 |
| 2009/0159180 A1* | 6/2009 | Shim ........................ H01B 1/16 |
| | | 156/89.12 |
| 2009/0229412 A1* | 9/2009 | Takashima ............ B22F 1/0085 |
| | | 75/343 |
| 2013/0153835 A1* | 6/2013 | Hinotsu ................... H01B 1/22 |
| | | 252/514 |
| 2013/0234078 A1* | 9/2013 | Saito ...................... B22F 1/102 |
| | | 252/514 |
| 2017/0252854 A1* | 9/2017 | Maier .................... B22F 1/065 |
| 2018/0117673 A1 | 5/2018 | Watanabe et al. |

FOREIGN PATENT DOCUMENTS

| | | | |
|---|---|---|---|
| JP | 20005081198 A | * | 3/2005 |
| JP | 2007-138287 A | | 6/2007 |
| JP | 2010-209417 A | | 9/2010 |
| JP | 2013047365 A | | 3/2013 |
| JP | 2013-159830 A | | 8/2013 |
| JP | 2016-060754 A | | 4/2016 |
| JP | 2016-071629 A | | 5/2016 |
| KR | 102007067794 A | * | 6/2007 |
| TW | 200728006 A | | 8/2007 |
| WO | WO-2016/052275 A1 | | 4/2016 |
| WO | WO-2016/080528 A1 | | 5/2016 |
| WO | WO-2021/100320 A1 | * | 5/2021 |

OTHER PUBLICATIONS

English translation of KR 10-2007-067794 (originally published Jun. 29, 2007) from K-PION.*

Wyrzykowski, D. et al., "Thermal behaviour of citric acid and isomeric aconitic acids", Journal of Thermal Analysis and Calorimetry, vol. 104, pp. 731-735, Published online Aug. 31, 2010.*

* cited by examiner

SILVER FINE PARTICLE PRODUCTION METHOD AND SILVER FINE PARTICLES

TECHNICAL FIELD

The present invention relates to a silver fine particle production method using a gas-phase process as well as silver fine particles, particularly to a silver fine particle production method and silver fine particles used to form conductive wiring and the like.

BACKGROUND ART

At present, a display device such as a liquid crystal display device is combined with a touch panel and used in tablet computers, smartphones and other devices, and the input operation using a touch panel has become widespread.

For touch panels, an electrode formed from a transparent conductive film using, for instance, an ITO (Indium Tin Oxide) is adopted. Touch panels are required to have flexibility in order to increase the degree of freedom of design of the touch panels and the like. However, the ITO and the like have the property of being vulnerable to bending and are not suitable for application as an electrode of a touch panel that would be bent during use. To cope with it, a touch panel having an electrode made of metal has been proposed.

For instance, a touch panel described in Patent Literature 1 has an electrode for touch panels that is constituted of conductive ink. A silver ink composition is mentioned as an example of the conductive ink.

Aside from that, for touch panels required to have flexibility, substrates therein need to be flexible, so that the use of a general-purpose resin such as PET (polyethylene terephthalate) or PE (polyethylene) is required. When a general-purpose resin such as PET or PE is used for a substrate, since its heat resistance is lower than that of substrates made of glass or ceramics, an electrode needs to be formed at lower temperatures.

For instance, Patent Literature 2 describes a composition used to form a transparent conductive layer of a touch panel or the like. The composition contains a metal nanowire such as a silver nanowire, a binder, and an acid such as an organic acid.

Patent Literature 3 describes a method of producing silver fine particles usable in wiring of touch panels.

CITATION LIST

Patent Literature

Patent Literature 1: JP 2016-71629 A
Patent Literature 2: JP 2016-60754 A
Patent Literature 3: WO 2016/080528

SUMMARY OF INVENTION

Technical Problems

As described above, Patent Literature 2 describes a composition used to form a transparent conductive layer of a touch panel or the like, and Patent Literature 3 describes a method of producing silver fine particles usable in wiring of touch panels. At present, however, there is a demand for a material that allows formation of wiring at a lower temperature while maintaining the properties such as electrical conductivity.

The present invention has been made to solve the problem that may arise from the conventional art and aims at providing a silver fine particle production method and silver fine particles that allow formation of wiring at a lower temperature while maintaining the properties such as electrical conductivity.

Solution to Problems

In order to attain the above object, the present invention provides a silver fine particle production method for producing silver fine particles using silver powder by means of a gas-phase process, the method comprising: a step of supplying an organic acid to the silver fine particles.

Preferably, the gas-phase process is a thermal plasma process or a flame process.

Preferably, in the step of supplying an organic acid, an aqueous solution containing the organic acid is sprayed to an atmosphere in which the organic acid is thermally decomposed.

Preferably, the organic acid consists only of C, O and H. Preferably, the organic acid is at least one of L-ascorbic acid, formic acid, glutaric acid, succinic acid, oxalic acid, DL-tartaric acid, lactose monohydrate, maltose monohydrate, maleic acid, D-mannite, citric acid, malic acid and malonic acid.

The present invention also provides silver fine particles each having a surface coating, wherein the surface coating contains at least a carboxyl group.

For example, the silver fine particles have a particle size of 1 to 100 nm.

The present invention also provides silver fine particles each having a surface coating, wherein the surface coating is constituted of an organic substance generated by thermal decomposition of an organic acid.

For example, the silver fine particles have a particle size of 1 to 100 nm.

Preferably, the organic acid is at least one of L-ascorbic acid, formic acid, glutaric acid, succinic acid, oxalic acid, DL-tartaric acid, lactose monohydrate, maltose monohydrate, maleic acid, D-mannite, citric acid, malic acid and malonic acid. Of these, the organic acid is preferably citric acid or malic acid.

The present invention also provides silver fine particles produced by the above silver fine particle production method according to the invention.

Advantageous Effects of Invention

The present invention makes it possible to produce silver fine particles that allow formation of wiring at a lower temperature while maintaining the properties such as electrical conductivity.

The present invention also makes it possible to provide silver fine particles that allow formation of wiring at a lower temperature while maintaining the properties such as electrical conductivity.

DESCRIPTION OF EMBODIMENTS

A silver fine particle production method and silver fine particles according to the present invention are described below in detail with reference to preferred embodiments shown in the accompanying drawings.

One example of the silver fine particle production method of the invention is described below.

Figure 1:
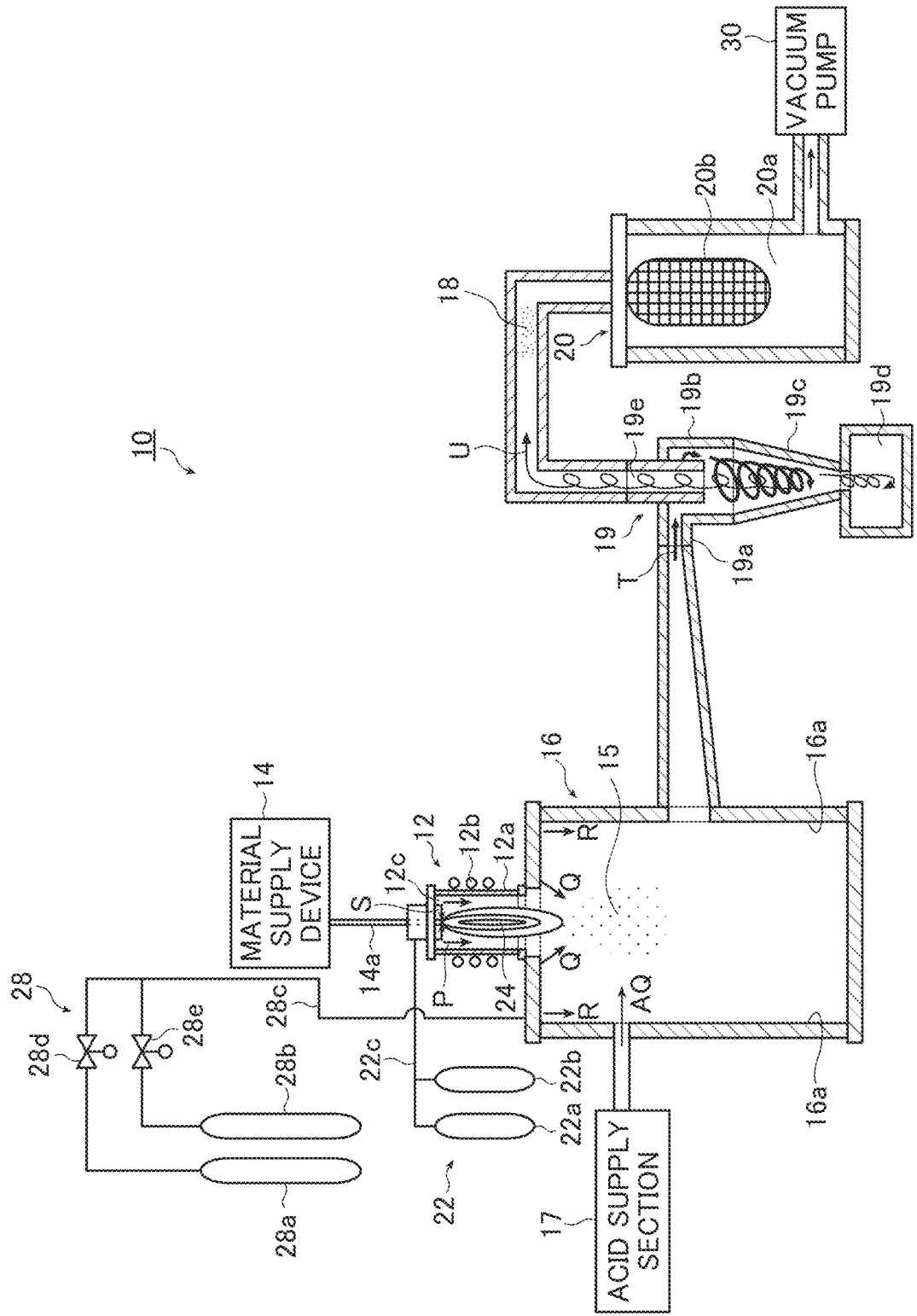
FIG. 1 is a schematic view showing an example of a fine particle production apparatus that is used in a silver fine particle production method according to an embodiment of the invention.

FIG. 1 is a schematic view showing an example of a fine particle production apparatus that is used in a silver fine particle production method according to an embodiment of the invention.

A fine particle production apparatus 10 (hereinafter referred to simply as "production apparatus 10") shown in FIG. 1 is used to produce silver fine particles.

The production apparatus 10 includes a plasma torch 12 generating thermal plasma, a material supply device 14 supplying raw material powder of the silver fine particles into the plasma torch 12, a chamber 16 serving as a cooling tank for use in producing primary fine particles 15 of silver, an acid supply section 17, a cyclone 19 removing, from the produced primary fine particles 15 of silver, coarse particles having a particle size equal to or larger than an arbitrarily specified particle size, and a collecting section 20 collecting secondary fine particles 18 of silver having a desired particle size as obtained by classification by the cyclone 19. The primary fine particles 15 of silver before an organic acid is supplied are particles in the middle of the production process of the silver fine particles of the invention, and the secondary fine particles 18 of silver are equivalent to the silver fine particles of the invention.

Various devices in, for example, JP 2007-138287 A may be used for the material supply device 14, the chamber 16, the cyclone 19 and the collecting section 20. The primary fine particles 15 of silver are also simply called primary fine particles 15.

In the embodiment under consideration, silver powder is used to produce the silver fine particles. The average particle size of the silver powder is appropriately set to allow easy evaporation of the powder in a thermal plasma flame and is, for example, not more than 100 μm, preferably not more than 10 μm, and more preferably not more than 5 μm.

The plasma torch 12 is constituted of a quartz tube 12a and a coil 12b for high frequency oscillation surrounding the outside of the quartz tube. A supply tube 14a to be described later which is for supplying raw material powder of the silver fine particles into the plasma torch 12 is provided on the top of the plasma torch 12 at the central part thereof. A plasma gas supply port 12c is formed in the peripheral portion of the supply tube 14a (on the same circumference). The plasma gas supply port 12c is in a ring shape.

A plasma gas supply source 22 is configured to supply plasma gas into the plasma torch 12 and for instance has a first gas supply section 22a and a second gas supply section 22b. The first gas supply section 22a and the second gas supply section 22b are connected to the plasma gas supply port 12c through piping 22c. Although not shown, the first gas supply section 22a and the second gas supply section 22b are each provided with a supply amount adjuster such as a valve for adjusting the supply amount. Plasma gas is supplied from the plasma gas supply source 22 into the plasma torch 12 through the plasma gas supply port 12c of ring shape in the direction indicated by arrow P and the direction indicated by arrow S.

For example, mixed gas of hydrogen gas and argon gas is used as plasma gas. In this case, hydrogen gas is stored in the first gas supply section 22a, while argon gas is stored in the second gas supply section 22b. Hydrogen gas is supplied from the first gas supply section 22a of the plasma gas supply source 22 and argon gas is supplied from the second gas supply section 22b thereof into the plasma torch 12 in the direction indicated by arrow P and the direction indicated by arrow S after passing through the plasma gas supply port 12c via the piping 22c. Argon gas may be solely supplied in the direction indicated by arrow P.

When a high frequency voltage is applied to the coil 12b for high frequency oscillation, a thermal plasma flame 24 is generated in the plasma torch 12.

It is necessary for the thermal plasma flame 24 to have a temperature higher than the boiling point of the raw material powder. A higher temperature of the thermal plasma flame 24 is more preferred because the raw material powder is more easily converted into a gas phase state; however, there is no particular limitation on the temperature. For instance, the thermal plasma flame 24 may have a temperature of 6,000° C., and in theory, the temperature is deemed to reach around 10,000° C.

The ambient pressure inside the plasma torch 12 is preferably up to atmospheric pressure. The ambient pressure of up to atmospheric pressure is not particularly limited and is, for example, in the range of 0.5 to 100 kPa.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

The material supply device 14 is connected to the top of the plasma torch 12 through the supply tube 14a. The material supply device 14 is configured to supply the raw material powder in a powdery form into the thermal plasma flame 24 in the plasma torch 12, for example.

For example, as described above, the device disclosed in JP 2007-138287 A may be used as the material supply device 14 that supplies silver powder in a powdery form. In this case, the material supply device 14 includes, for example, a storage tank (not shown) storing silver powder, a screw feeder (not shown) transporting the silver powder in a fixed amount, a dispersion section (not shown) dispersing the silver powder transported by the screw feeder to convert it into the state of primary particles before the silver powder is finally sprayed, and a carrier gas supply source (not shown).

Together with a carrier gas to which push-out pressure is applied from the carrier gas supply source, the silver powder is supplied into the thermal plasma flame 24 in the plasma torch 12 through the supply tube 14a.

The configuration of the material supply device 14 is not particularly limited as long as the device prevents the silver powder from agglomerating, thus making it possible to spray the silver powder into the plasma torch 12 with the dispersed state maintained. Inert gas such as argon gas is used as the carrier gas, for example. The flow rate of the carrier gas can be controlled using, for instance, a flowmeter such as a float type flowmeter. The flow rate value of the carrier gas indicates a reading on the flowmeter.

The chamber 16 is provided below and adjacent to the plasma torch 12, and a gas supply device 28 is connected to the chamber 16. The primary fine particles 15 of silver are produced in the chamber 16. The chamber 16 serves as a cooling tank.

The gas supply device 28 is configured to supply cooling gas into the chamber 16. The gas supply device 28 includes a first gas supply source 28a, a second gas supply source 28b and piping 28c, and further includes a pressure application means (not shown) such as a compressor or a blower which applies push-out pressure to the cooling gas to be supplied into the chamber 16. The gas supply device 28 is also provided with a pressure control valve 28d which controls the amount of gas supplied from the first gas supply source 28a and a pressure control valve 28e which controls the amount of gas supplied from the second gas supply source 28b. For example, the first gas supply source 28a stores argon gas, while the second gas supply source 28b stores methane gas ($CH_4$ gas). In this case, the cooling gas is mixed gas of argon gas and methane gas.

The gas supply device 28 supplies the mixed gas of argon gas and methane gas as the cooling gas at, for example, 45 degrees in the direction of arrow Q toward a tail portion of the thermal plasma flame 24, i.e., the end of the thermal plasma flame 24 on the opposite side from the plasma gas supply port 12c, that is, a terminating portion of the thermal plasma flame 24, and also supplies the cooling gas from above to below along an inner wall 16a of the chamber 16, that is, in the direction of arrow R shown in FIG. 1.

The cooling gas supplied from the gas supply device 28 into the chamber 16 rapidly cools the silver powder having been converted to a gas phase state through the thermal plasma flame 24, thereby obtaining the primary fine particles 15 of silver. Besides, the cooling gas has additional functions such as contribution to classification of the primary fine particles 15 in the cyclone 19. The cooling gas is, for instance, mixed gas of argon gas and methane gas.

When the primary fine particles 15 of silver having just been produced collide with each other to form agglomerates, this causes nonuniform particle size, resulting in lower quality. However, dilution of the primary fine particles 15 with the mixed gas which is supplied as the cooling gas in the direction of arrow Q toward the tail portion (terminating portion) of the thermal plasma flame prevents the fine particles from colliding with each other to agglomerate together.

In addition, the mixed gas supplied as the cooling gas in the direction of arrow R prevents the primary fine particles 15 from adhering to the inner wall 16a of the chamber 16 in the process of collecting the primary fine particles 15, whereby the yield of the produced primary fine particles 15 is improved.

Hydrogen gas may be added to the mixed gas of argon gas and methane gas used as the cooling gas. In this case, a third gas supply source (not shown) and a pressure control valve (not shown) that controls the amount of gas supply are further provided, and hydrogen gas is stored in the third gas supply source. For instance, hydrogen gas may be supplied by a predetermined amount in at least one of the directions of arrow Q and arrow R.

The acid supply section 17 is configured to supply an organic acid to the primary fine particles 15 of silver having been rapidly cooled by the cooling gas and thereby obtained. An organic acid supplied to a higher temperature region than the decomposition temperature of the organic acid is thermally decomposed and, on the primary fine particles 15 produced by rapidly cooling the thermal plasma having a temperature of about 10,000° C., the organic acid is deposited as an organic substance containing hydrocarbon (CnHm) and either a carboxyl group (—COOH) or a hydroxyl group (—OH) that provides hydrophilicity and acidity. Consequently, silver fine particles that are acidic can be obtained.

The acid supply section 17 may have any configuration as long as it can provide an organic acid to the primary fine particles 15 of silver. For instance, an aqueous organic acid solution is used, and the acid supply section 17 sprays the aqueous organic acid solution into the chamber 16.

The acid supply section 17 includes a container (not shown) storing an aqueous organic acid solution (not shown) and a spray gas supply section (not shown) for converting the aqueous organic acid solution in the container into droplets. The spray gas supply section converts an aqueous solution into droplets using spray gas, and an aqueous organic acid solution AQ converted into droplets is supplied to the primary fine particles 15 of silver in the chamber 16. When the aqueous organic acid solution AQ is supplied (a step of supplying an organic acid), the atmosphere in the chamber 16 is an atmosphere in which the organic acid is thermally decomposed.

For the aqueous organic acid solution, pure water is used as the solvent, for instance. The organic acid is soluble in water, preferably has a low boiling point, and is preferably constituted of C, O and H only. Examples of the organic acid that may be used include L-ascorbic acid ($C_6H_8O_6$), formic acid ($CH_2O_2$), glutaric acid ($C_5H_8O_4$), succinic acid ($C_4H_6O_4$), oxalic acid ($C_2H_2O_4$), DL-tartaric acid ($C_4H_6O_6$), lactose monohydrate, maltose monohydrate, maleic acid ($C_4H_4O_4$), D-mannite ($C_6H_{14}O_6$), citric acid ($C_6H_8O_7$), malic acid ($C_4H_6O_5$) and malonic acid ($C_3H_4O_4$). The use of at least one of the foregoing organic acids is preferred.

For the spray gas used to convert the aqueous organic acid solution into droplets, argon gas is adopted for instance, but the spray gas is not limited to argon gas and may be inert gas such as nitrogen gas.

As shown in FIG. 1, the cyclone 19 is provided to the chamber 16 to classify the primary fine particles 15 of silver having been supplied with the organic acid, based on a desired particle size. The cyclone 19 includes an inlet tube 19a which supplies the primary fine particles 15 from the chamber 16, a cylindrical outer tube 19b connected to the inlet tube 19a and positioned at an upper portion of the cyclone 19, a truncated conical part 19c continuing downward from the bottom of the outer tube 19b and having a gradually decreasing diameter, a coarse particle collecting chamber 19d connected to the bottom of the truncated conical part 19c for collecting coarse particles having a particle size equal to or larger than the above-mentioned desired particle size, and an inner tube 19e connected to the collecting section 20 to be detailed later and projecting from the outer tube 19b.

A gas stream containing the primary fine particles 15 is blown in from the inlet tube 19a of the cyclone 19 along the inner peripheral wall of the outer tube 19b, and this gas stream flows in the direction from the inner peripheral wall of the outer tube 19b toward the truncated conical part 19c as indicated by arrow T in FIG. 1, thus forming a downward swirling stream.

When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged to the outside of the system through the inner tube 19e along with the upward stream on the inner wall of the truncated conical part 19c.

The apparatus is configured such that a negative pressure (suction force) is exerted from the collecting section 20 to be detailed later through the inner tube 19e. The apparatus is also configured such that, under the negative pressure (suction force), the silver fine particles separated from the swirling gas stream are sucked as indicated by arrow U and sent to the collecting section 20 through the inner tube 19e.

On the extension of the inner tube 19e which is an outlet for the gas stream in the cyclone 19, the collecting section 20 for collecting the secondary fine particles (silver fine particles) 18 having a desired particle size on the order of nanometers is provided. The collecting section 20 includes a collecting chamber 20a, a filter 20b provided in the collecting chamber 20a, and a vacuum pump 30 connected through a pipe provided at a lower portion of the collecting chamber 20a. The fine particles delivered from the cyclone 19 are sucked by the vacuum pump 30 to be introduced into the collecting chamber 20a, remain on the surface of the filter 20b, and are then collected.

It should be noted that the number of cyclones used in the production apparatus 10 is not limited to one and may be two or more.

Next, one example of the method of producing silver fine particles using the production apparatus 10 above is described below.

First, for example, silver powder having an average particle size of not more than 5 μm is charged into the material supply device 14 as the raw material powder of the silver fine particles.

For example, argon gas and hydrogen gas are used as the plasma gas, and a high frequency voltage is applied to the coil 12b for high frequency oscillation to generate the thermal plasma flame 24 in the plasma torch 12.

Further, for instance, mixed gas of argon gas and methane gas is supplied as the cooling gas in the direction of arrow Q from the gas supply device 28 to the tail portion of the thermal plasma flame 24, i.e., the terminating portion of the thermal plasma flame 24. At that time, the mixed gas of argon gas and methane gas is also supplied as the cooling gas in the direction of arrow R.

Next, the silver powder is transported with gas, e.g., argon gas used as the carrier gas and supplied to the thermal plasma flame 24 in the plasma torch 12 through the supply tube 14a. The silver powder supplied is evaporated in the thermal plasma flame 24 to be converted into a gas phase state and is rapidly cooled with the cooling gas, thus producing the primary fine particles 15 of silver (silver fine particles). Further, the acid supply section 17 sprays the aqueous organic acid solution in a droplet form to the primary fine particles 15 of silver.

Then, the primary fine particles 15 of silver thus obtained in the chamber 16 are blown in through the inlet tube 19a of the cyclone 19 together with a gas stream along the inner peripheral wall of the outer casing 19b, and accordingly, this gas stream flows along the inner peripheral wall of the outer casing 19b as indicated by arrow T in FIG. 1, thus forming a swirling stream which goes downward. When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged from the inner wall to the outside of the system along with the upward stream on the inner wall of the truncated conical part 19c.

Due to the negative pressure (suction force) applied by the vacuum pump 30 through the collecting section 20, the discharged secondary fine particles (silver fine particles) 18 are sucked in the direction indicated by arrow U in FIG. 1 and sent to the collecting section 20 through the inner tube 19e to be collected on the filter 20b of the collecting section 20. The internal pressure of the cyclone 19 at this time is preferably equal to or lower than the atmospheric pressure. For the particle size of the secondary fine particles (silver fine particles) 18, an arbitrary particle size on the order of nanometers is specified according to the intended purpose.

Thus, the silver fine particles that are acidic can be easily and reliably obtained by merely subjecting the silver powder to plasma treatment and, for instance, spraying an aqueous organic acid solution thereto.

While the primary fine particles of silver are formed using a thermal plasma flame, the primary fine particles of silver may be formed by a gas-phase process. Thus, the method of producing the primary fine particles of silver is not limited to a thermal plasma process using a thermal plasma flame as long as it is a gas-phase process, and may alternatively be one using a flame process.

Furthermore, the silver fine particles produced by the method of producing silver fine particles according to this embodiment have a narrow particle size distribution, in other words, have a uniform particle size, and coarse particles of 1 μm or more are hardly included.

The flame process herein is a method of synthesizing fine particles by using a flame as the heat source and putting a silver-containing raw material through the flame. In the flame process, the silver-containing raw material is supplied to a flame, and then cooling gas is supplied to the flame to decrease the flame temperature and thereby suppress the growth of silver particles, thus obtaining the primary fine particles 15 of silver. In addition, an organic acid is supplied to the primary fine particles 15 to thereby produce the silver fine particles.

For the cooling gas and the organic acid, the same gases and acids as those mentioned for the thermal plasma flame described above can be used.

Next, the silver fine particles are described.

Figure 2:
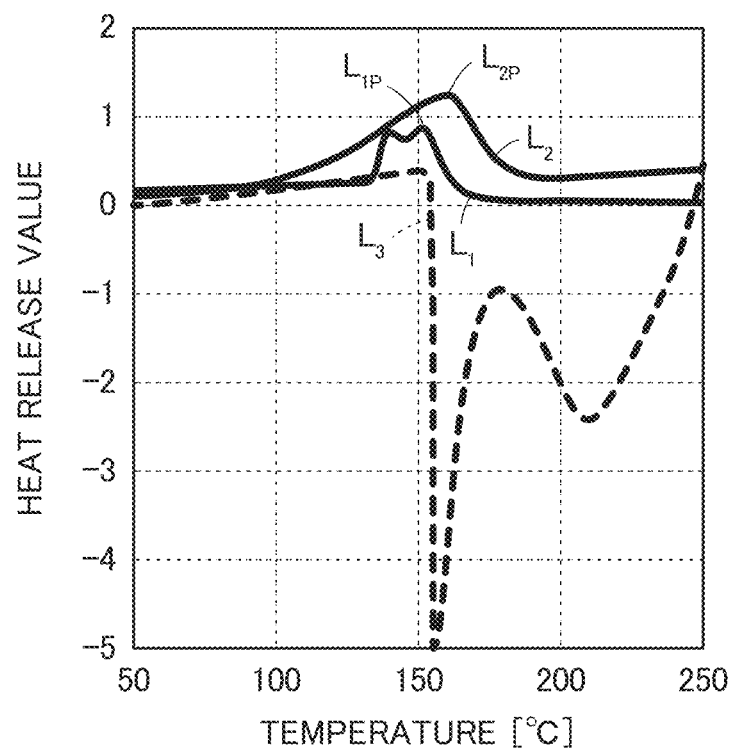
FIG. 2 is a graph showing an example of a differential thermal curve of silver fine particles according to an embodiment of the invention.

FIG. 2 is a graph showing an example of a differential thermal curve of silver fine particles according to an embodiment of the invention.

In FIG. 2, $L_1$ represents a differential thermal analysis (DTA) curve of the silver fine particles of the invention, $L_2$ represents a differential thermal analysis (DTA) curve of conventional silver fine particles, and $L_3$ represents a differential thermal analysis (DTA) curve of citric acid. As shown in FIG. 2, the temperature at the peak $L_{1p}$ of the silver fine particles of the invention is lower than that at the peak $L_{2p}$ of the conventional silver fine particles. This suggests that the silver fine particles of the invention can be baked at a lower temperature compared to the conventional silver fine particles.

Note that the differential thermal analysis (DTA) curve $L_1$ of the silver fine particles of the invention exhibits a different tendency from the differential thermal analysis (DTA) curve $L_3$ of citric acid.

The silver fine particles of the invention are those called nanoparticles with a particle size of, for example, 1 to 100 nm. The particle size is the average particle size measured using the BET method. The silver fine particles of the invention are produced by, for instance, the production method described above and obtained in a particulate form. Thus, the silver fine particles of the invention are not present in a dispersed form in a solvent or the like but present alone. Therefore, there is no particular limitation on the combination of a solvent and the like, and the degree of freedom is high in selection of a solvent.

Figure 3:
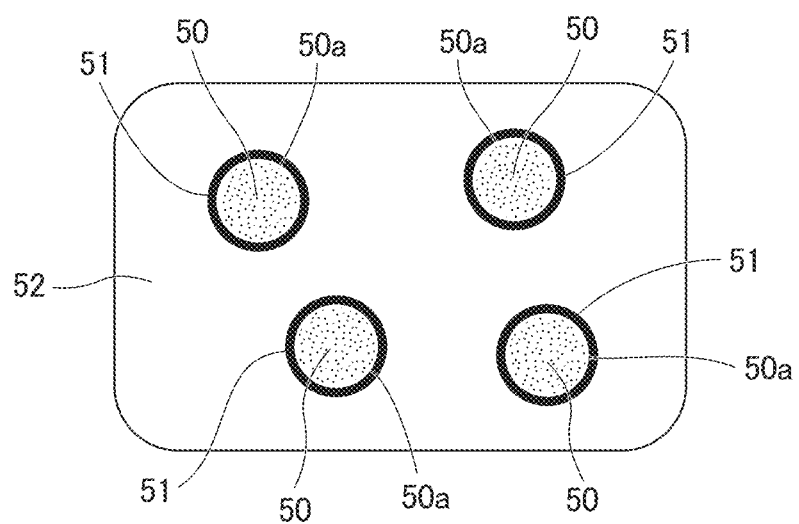
FIG. 3 is a schematic view showing the silver fine particles according to an embodiment of the invention.

As shown in FIG. 3, each silver fine particle 50 has a surface coating 51 on its surface 50a. The surface condition of the silver fine particles 50 including the surface coatings 51 on their surfaces 50a was examined, and the results suggesting that hydrocarbon (CnHm) was present on the surfaces and in addition to the hydrocarbon (CnHm), a hydroxyl group (—OH) or a carboxyl group (—COOH) that provides hydrophilicity and acidity was obviously present, were obtained.

The surface coating 51 is constituted of an organic substance that is generated by thermal decomposition of an organic acid and that contains hydrocarbon (CnHm) and either a carboxyl group (—COOH) or a hydroxyl group (—OH) which provides hydrophilicity and acidity. For example, the surface coating is constituted of an organic substance generated by thermal decomposition of citric acid or malic acid. Specifically, the hydroxyl group (—OH) and the carboxyl group (—COOH) mentioned above are derived from, for example, the above-mentioned organic acid.

While the surface coating 51 contains a hydroxyl group and a carboxyl group as described above, it suffices if the surface coating 51 contains at least a carboxyl group.

When the surface condition of the conventional silver fine particles was examined, the presence of hydrocarbon (CnHm) was confirmed, but such a result clearly suggesting the presence of a hydroxyl group and a carboxyl group was not obtained.

The surface condition of the silver fine particles 50 can be examined using, for instance, an FT-IR (Fourier transform infrared spectrometer).

When the pH of the silver fine particles of the invention and the pH of the conventional silver fine particles were determined, the silver fine particles of the invention had a pH of 3.5 to 6.0 and had an acidic property. The conventional silver fine particles had a pH of 8 to 9 and had a substantially neutral property.

The pH values above are measurements obtained as follows: Pure water was added to silver fine particles and left to stand for a while, whereafter the pH of a pure water part was measured.

The silver fine particles of the invention were charged into a test tube having pure water and oil therein, stirred, and then left to stand. As a result, it was confirmed that the pure water and the oil were separated into a water layer and an oil layer and the silver fine particles were dispersed in the water layer.

In the same manner, the conventional silver fine particles were charged into a test tube having pure water and oil therein, stirred, and then left to stand. As a result, it was confirmed that the pure water and the oil were separated into a water layer and an oil layer and the silver fine particles were dispersed in the oil layer. Those results reveal that the silver fine particles of the invention have higher hydrophilicity than the conventional silver fine particles.

Thus, the silver fine particles of the invention have a more acidic property and higher hydrophilicity than the conventional silver fine particles.

As described above, the conventional silver fine particles have a substantially neutral property. It is necessary to add a large amount of dispersant (not shown) in order to disperse the conventional silver fine particles in a solution 52 like the silver fine particles 50 in FIG. 3. For the conventional silver fine particles, there is a possibility that a large amount of dispersant hampers the decrease in baking temperature.

In contrast, the silver fine particles of the invention have an acidic property as described above. Accordingly, in dispersing the silver fine particles 50 in the solution 52 as shown in FIG. 3, only a small amount of basic dispersant (not shown) is required to have a necessary dispersed state. Therefore, baking at a low temperature is possible.

Since a necessary dispersed state can be established with a small amount of basic dispersant, a coating film can be formed with a smaller amount of dispersant. Therefore, baking at a low temperature is possible, and a uniform film can be formed. Thus, the silver fine particles of the invention allow formation of wiring at a lower temperature while maintaining the properties such as electrical conductivity.

Figure 4:
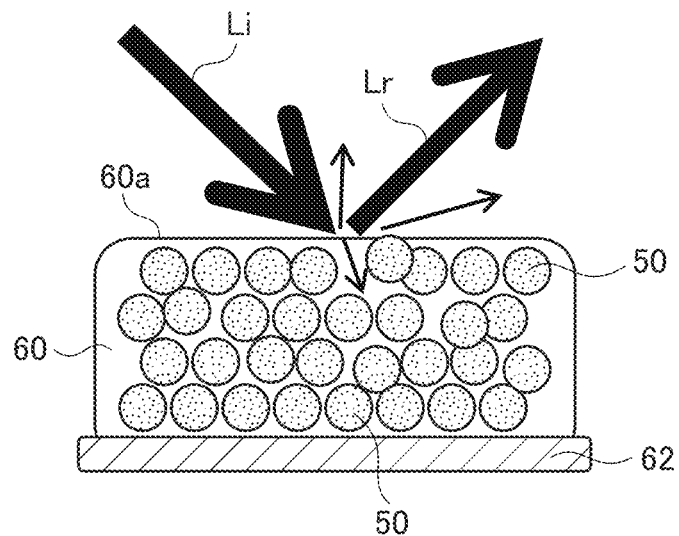
FIG. 4 is a schematic view illustrating a specularly reflected light value.
Figure 5:
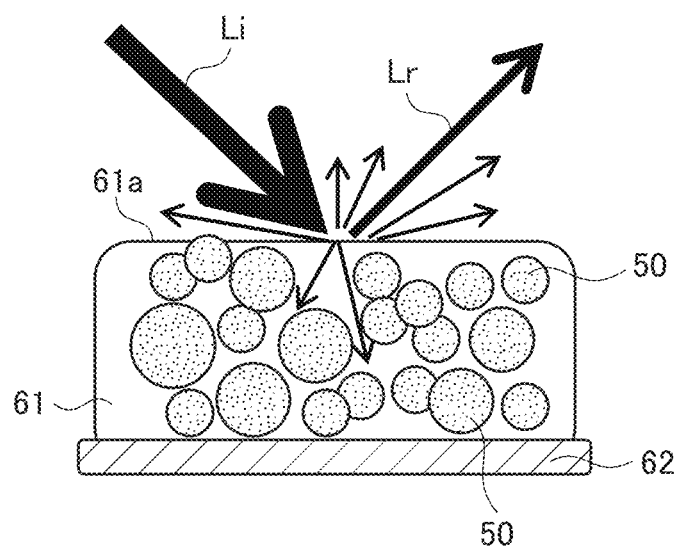
FIG. 5 is a schematic view illustrating a specularly reflected light value.

The uniformity of a film can be evaluated using a specularly reflected light value. FIGS. 4 and 5 are schematic views illustrating a specularly reflected light value. Incident light entering an object is expressed as follows.

Incident light=specularly reflected light+diffusely reflected light+internal scattering light+transmitted light+absorbed light The specularly reflected light value becomes larger when a film is uniform, dense and flat. Accordingly, the specularly reflected light value serves as an index of the uniformity, density and smoothness of a film.

A film 60 shown in FIG. 4 is formed on a substrate 62 and has plural silver fine particles 50 therein. The plural silver fine particles 50 are uniform in size, and the dispersion condition thereof is good. A film 61 shown in FIG. 5 is formed on the substrate 62 and has plural silver fine particles 50 therein, where the plural silver fine particles 50 are not uniform in size, and the dispersion condition thereof is poor.

Incident light Li incident on a surface 60a of the film 60 shown in FIG. 4 generates specularly reflected light Lr. Incident light Li incident on a surface 61a of the film 61 shown in FIG. 5 also generates specularly reflected light Lr.

The film 60 shown in FIG. 4 is a uniform film in which the silver fine particles 50 have the same size and are in a good dispersion condition with few gaps; therefore, the amounts of internal scattering light and diffusely reflected light are small while the amount of specularly reflected light is large. That is, the specularly reflected light value is large.

The film 61 shown in FIG. 5 is a nonuniform film in which the silver fine particles 50 have uneven size and are in a poor dispersion condition with many gaps; therefore, the amounts of internal scattering light and diffusely reflected light increase while the amount of specularly reflected light decrease. That is, the specularly reflected light value is small.

Figure 6:
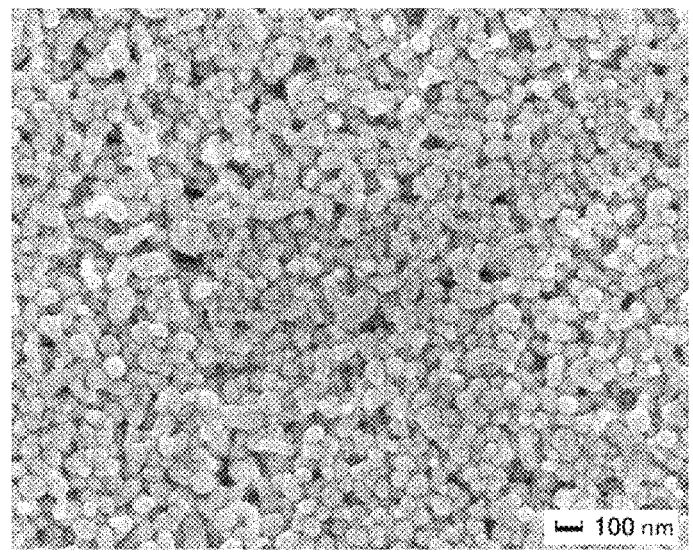
FIG. 6 is a schematic view showing an SEM image of the silver fine particles according to an embodiment of the invention.
Figure 7:
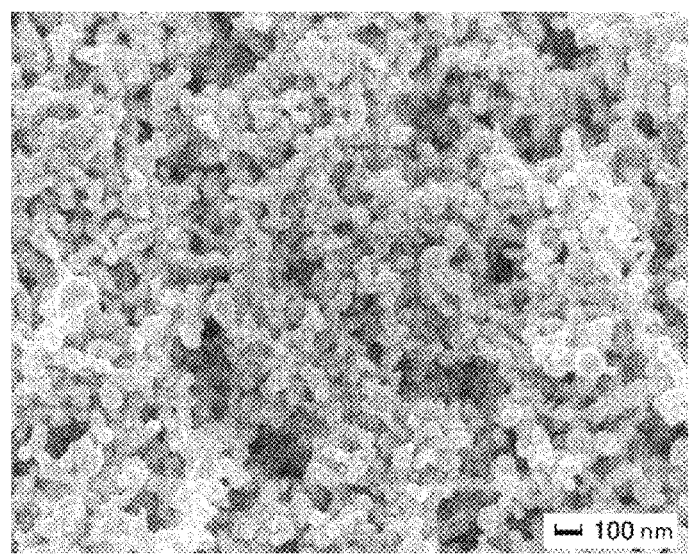
FIG. 7 is a schematic view showing an SEM image of the silver fine particles according to an embodiment of the invention.

An SEM (scanning electron microscope) image of FIG. 6 shows the film 60 of FIG. 4, and an SEM image of FIG. 7 shows the film 61 of FIG. 5. In the SEM image of FIG. 6, the specularly reflected light value is 21.7, and in the SEM image of FIG. 7, the specularly reflected light value is 0.4.

Comparing the SEM image of FIG. 6 and the SEM image of FIG. 7, it can be understood that FIG. 7 showing the SEM image of the film 61 of FIG. 5 is a more nonuniform film. In this manner, the uniformity of a film can be evaluated using the specularly reflected light value. The specularly reflected light value can be measured using, for instance, a spectrophotometer.

The present invention is basically configured as above. While the silver fine particle production method and the silver fine particles according to the invention are described above in detail, the invention is by no means limited to the foregoing embodiments and it should be understood that various improvements and modifications are possible without departing from the scope and spirit of the invention.

EXAMPLES

The characteristic features of the present invention are described below in further detail with reference to examples. The treatments and treatment procedures illustrated in the examples below may be modified as appropriate as long as they do not depart from the scope and spirit of the present invention. Therefore, the scope of the present invention should not be construed as being limited by the following specific examples.

In the examples, the pH, the specularly reflected light value of a coating film, and the resistance values at different baking temperatures were measured for silver fine particles of Examples 1 and 2 and Comparative Examples 1 and 2. The results are shown in Table 1 below.

In the following, the pH of silver fine particles, the specularly reflected light value of a coating film, and the resistance values at different baking temperatures are described.

<pH of Silver Fine Particles>

The pH of silver fine particles was measured as follows.

First, a specified amount of silver fine particles were charged in a container, and pure water (20 milliliters) was added dropwise to the silver fine particles and left to stand for 120 minutes. Then, the pH of a pure water part was measured. The pH was measured by a glass electrode method.

<Specularly Reflected Light Value>

The specularly reflected light value was measured as follows.

First, silver fine particles were dispersed in a solution composed of a solvent and a dispersant. Thereafter, this dispersion liquid was applied onto a glass slide to form a coating film, and then the specularly reflected light value of the coating film was measured with a spectrophotometer.

For the dispersant, BYK-112 (BYK Japan KK) was used.

<Resistance Values>

The resistance values was measured as follows.

First, silver fine particles were dispersed in a solution composed of a solvent and a dispersant. Subsequently, this dispersion liquid was applied onto a glass slide to form a coating film. Thereafter, the coating film was baked at, of the temperatures 150° C. and 180° C., a baking temperature specified in advance, and then the resistance values of the baked coating film was measured by a four-point-probe method.

For the baking, the glass slide having the coating film thereon was placed in a furnace in which the temperature had reached, of the temperatures 150° C. and 180° C., a baking temperature specified in advance, and was retained in the furnace for 1 hour to be baked. The atmosphere in the furnace was set to an air atmosphere.

For Examples 1-2 and 2-2, the resistance values at a baking temperature of 180° C. was not measured. Accordingly, the spaces of "Baking temperature 180° C." were given "-" in Table 1 below.

The respective silver fine particles of Examples 1 and 2 and Comparative Examples 1 and 2 were produced using the fine particle production apparatus 10 described above.

Silver powder having an average particle size of 5 μm was used as the raw material powder.

Argon gas was used as the carrier gas, and mixed gas of argon gas and hydrogen gas was used as the plasma gas. Mixed gas of argon gas and methane gas was used as the cooling gas.

In Example 1, using citric acid as the organic acid and pure water as the solvent, an aqueous solution containing citric acid (citric acid concentration: 15 W/W %) was sprayed to primary fine particles of silver with a spray gas. Argon gas was used as the spray gas.

In Example 2, using malic acid as the organic acid and pure water as the solvent, an aqueous solution containing malic acid (malic acid concentration: 15 W/W %) was sprayed to primary fine particles of silver with a spray gas. Argon gas was used as the spray gas.

In Comparative Examples 1 and 2, no aqueous solution containing an organic acid was sprayed to primary fine particles of silver.

The production conditions of silver fine particles were as follows. Plasma gas: argon gas (200 liters/minute), hydrogen gas (5 liters/minute); carrier gas: argon gas (5 liters/minute); rapidly-cooling gas: argon gas (900 liters/minute), methane gas (1 liter/minute); internal pressure: 40 kPa.

TABLE 1

|  | pH | Dispersant concentration (wt %) | Specularly reflected light value of coating film | Resistance values after baking ($\Omega \cdot cm$) | |
|---|---|---|---|---|---|
|  |  |  |  | Baking temp. 150° C. | Baking temp. 180° C. |
| Example 1-1 | 5.1 | 6.25 | 7.60 | $2.10 \times 10^{-3}$ | $8.60 \times 10^{-4}$ |
| Example 2-1 | 4.0 | 6.25 | 14.45 | $1.10 \times 10^{-3}$ | $5.80 \times 10^{-4}$ |
| Example 1-2 | 5.1 | 3.20 | 11.08 | $1.10 \times 10^{-3}$ | — |
| Example 2-2 | 4.0 | 3.20 | 16.23 | $6.70 \times 10^{-4}$ | — |
| Comparative example 1 | 8.8 | 6.25 | 0.41 | $7.00 \times 10^{-3}$ | $1.80 \times 10^{-3}$ |
| Comparative example 2 | 8.0 | 6.25 | 5.92 | $2.50 \times 10^{1}$ | $5.70 \times 10^{0}$ |

As shown in Table 1, Examples 1 and 2 had more excellent specularly reflected light values of the coating films than those in Comparative Examples 1 and 2. This proves that in Examples 1 and 2, a more uniform film can be formed compared to Comparative Examples 1 and 2.

Examples 1 and 2 had lower resistance values at the lower baking temperature compared to Comparative Examples 1 and 2. In the present invention, wiring was able to be formed at a lower temperature while the properties such as electrical conductivity was maintained.

REFERENCE SIGNS LIST 10 fine particle production apparatus
12 plasma torch
14 material supply device
15 primary fine particle
16 chamber
17 acid supply section
18 fine particle (secondary fine particle)
19 cyclone
20 collecting section
22 plasma gas supply source
24 thermal plasma flame
28 gas supply device
30 vacuum pump
Li incident light
Lr specularly reflected light

The invention claimed is:

1. A silver fine particle production method for producing silver fine particles using silver powder by means of a thermal plasma process, the method comprising:
   supplying the silver powder into a thermal plasma flame and supplying cooling gas to a tail portion of the thermal plasma flame to thereby produce primary fine particles of silver; and
   supplying an organic acid to the primary fine particles of silver,
   wherein said supplying an organic acid to the primary fine particles of silver comprises spraying an aqueous solution containing the organic acid to an atmosphere in which the organic acid is thermally decomposed, to thereby coat the primary fine particles of silver with an organic substance generated by thermal decomposition of the organic acid.

2. The silver fine particle production method according to claim 1, wherein the organic acid consists only of C, O and H.

3. The silver fine particle production method according to claim 1, wherein the organic acid is at least one of L-ascorbic acid, formic acid, glutaric acid, succinic acid, oxalic acid, DL-tartaric acid, lactose monohydrate, maltose monohydrate, maleic acid, D-mannite, citric acid, malic acid and malonic acid.

* * * * *

UNITED STATES PATENT AND TRADEMARK OFFICE
CERTIFICATE OF CORRECTION

| | | |
|---|---|---|
| PATENT NO. | : 11,691,200 B2 | Page 1 of 1 |
| APPLICATION NO. | : 16/963796 | |
| DATED | : July 4, 2023 | |
| INVENTOR(S) | : Shu Watanabe et al. | |

It is certified that error appears in the above-identified patent and that said Letters Patent is hereby corrected as shown below:

On the Title Page

Title item (54) change "SILVER FINE PARTICLE PRODUCTION METHOD AND SILVER FINE PARTICLES" to --SILVER FINE PARTICLE PRODUCTION METHOD--.

In the Specification

At Column 1, Lines 1-2 change "SILVER FINE PARTICLE PRODUCTION METHOD AND SILVER FINE PARTICLES" to --SILVER FINE PARTICLE PRODUCTION METHOD--.

Signed and Sealed this
Seventh Day of November, 2023

Katherine Kelly Vidal
*Director of the United States Patent and Trademark Office*